United States Patent [19]

Potter

[11] Patent Number: 5,129,500

[45] Date of Patent: Jul. 14, 1992

[54] CONTROL VALVE FOR TIMED CLUTCH ENGAGEMENT

[75] Inventor: James C. Potter, Dearborn Heights, Mich.

[73] Assignee: General Motors Corporation, Detroit, Mich.

[21] Appl. No.: 791,300

[22] Filed: Nov. 12, 1991

[51] Int. Cl.⁵ .................... F16D 43/28; F16D 25/12
[52] U.S. Cl. .................. 192/109 F; 91/459; 137/625.6
[58] Field of Search ............ 192/109 F, 3.58; 91/433, 459, 469; 137/102, 116, 625.6

[56] References Cited

U.S. PATENT DOCUMENTS

| | | | |
|---|---|---|---|
| 3,559,669 | 2/1971 | Dach et al. | 137/102 |
| 3,583,422 | 6/1971 | Dach et al. | 137/116 |
| 3,991,865 | 11/1976 | Kohatsu | 192/109 F |
| 4,245,671 | 1/1981 | Kosugui | 137/625.6 X |
| 4,265,346 | 5/1981 | Emmadi | 192/0.034 |
| 4,301,715 | 11/1981 | Acar | 91/459 X |
| 4,469,011 | 9/1984 | Löffler | 91/433 |
| 4,567,971 | 2/1986 | Hille et al. | 192/12 |
| 4,617,968 | 10/1986 | Hendrixon | 137/625.64 |
| 4,676,349 | 6/1987 | Coutant | 192/3.57 |
| 4,741,364 | 5/1988 | Stoss et al. | 137/625.6 X |
| 4,838,313 | 6/1989 | Kobayashi et al. | 91/433 X |
| 4,899,785 | 2/1990 | Inokuchi | 192/109 F X |

FOREIGN PATENT DOCUMENTS

| | | | |
|---|---|---|---|
| 0234622 | 9/1989 | Japan | 192/109 F |
| 2101256A | 1/1983 | United Kingdom . | |

*Primary Examiner*—Rodney H. Bonck
*Assistant Examiner*—Andrea Pitts
*Attorney, Agent, or Firm*—Donald F. Scherer

[57] ABSTRACT

A control valve assembly has a multi-land spool valve slidably disposed in a stepped valve bore. One end of the spool valve has disposed adjacent thereto a control chamber in which a control signal pressure is selectively applied while the other end has a timing chamber disposed adjacent thereto which has the signal pressure selectively applied therein when the clutch is subjected to apply pressure. The timing chamber permits rapid clutch fill and controlled pressure rise of the clutch apply fluid during clutch engagement.

2 Claims, 1 Drawing Sheet

CONTROL VALVE FOR TIMED CLUTCH ENGAGEMENT

BACKGROUND OF THE INVENTION

This invention relates to hydraulic valve control systems, and more particularly, to hydraulic control systems having a valve mechanism for controlling the engagement and disengagement of a torque transmitting friction device. Specifically, this invention relates to such systems wherein the friction device has a time-pressure relationship during engagement.

During the engagement of a fluid operated torque transmitting device, such as a clutch or brake, it is desirable to provide an engagement signal having a rapid fill portion and a controlled pressuring portion. This is generally accomplished by combining one or more valves with an accumulator in a friction device fill circuit. The fill time and pressure is generally determined by the minimum spring load on the accumulator or the minimum spring load plus any accumulator bias pressure that is present and the volume of the apply chamber for the friction device.

The pressuring or pressure rise portion is controlled by the spring rate in the accumulator plus any variable bias pressures that might be present. These systems require at least a shift valve and an accumulator. Some systems also require control valving for the accumulator. The prior art mechanisms require space and therefore add to the size and weight of the system. Also, in these systems, the machining complexity and added structures contribute to the overall cost of the system.

SUMMARY OF THE INVENTION

The present invention incorporates the shift valve function and accumulator function in a single clutch timing control valve. This eliminates the complexity of accumulator timed control circuits. The timing control valve also eliminates the spring member normally associated with the shift valve, thus further reducing the cost and weight of the system.

It is therefore an object of this invention to provide an improved torque transmitting friction device engagement timing valve.

It is another object of this invention to provide an improved clutch engaging control mechanism, wherein a single valve element provides clutch apply oil and clutch engagement timing.

It is a further object of this invention to provide an improved clutch engagement control, wherein a single valve element provides both an engagement control function and an accumulator timing function without the use of a spring element or a separate accumulator piston and chamber.

These and other objects and advantages of the present invention will be more apparent from the following specification and drawings.

DESCRIPTION OF AN EXEMPLARY EMBODIMENT

Figure 1:
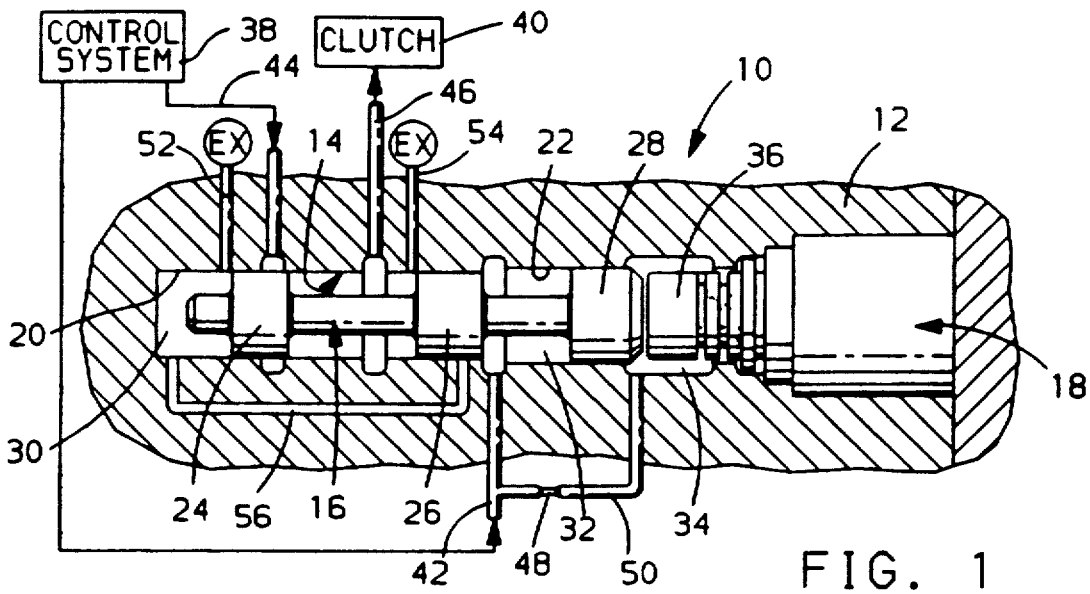
FIG. 1 is a diagrammatic representation of a valve assembly incorporating the present invention and depicting one operating mode.

Referring to the drawings, wherein like characters represent the same or corresponding parts throughout the several views, there is seen in FIG. 1 a valve assembly 10, which includes a valve body 12 having a stepped valve bore 14, a stepped diameter valve spool 16 and a solenoid control valve 18.

The stepped valve bore 14 has a small diameter portion 20 and a large diameter portion 22. The valve spool 16 has a pair of spaced equal diameter lands 24 and 26 slidably disposed in the small diameter portion 20 and a large diameter valve land 28 slidably disposed in the portion 22.

The land 24 cooperates with the valve bore 14 to form a timing chamber 30. The land 26, large diameter land 28 and the valve bore 14 cooperate to form a control chamber 32 which has an effective cross-sectional area equal to the differential of the areas of valve lands 26 and 28.

The valve land 28 and valve bore 14 cooperate to form a signal control chamber 34 in which an end portion 36 of the solenoid valve 18 is also disposed. The valve assembly 10 is disposed in fluid communication with a conventional electro-hydraulic control system 38 and a conventional fluid operated torque transmission friction device, such as a clutch 40.

The control system 38 communicates with the valve assembly 10 through an actuator feed passage 42 and a clutch feed passage 44. The valve assembly 10 communicates with the clutch 40 via a clutch apply passage 46. The actuator feed passage 42 is connected with the valve bore 14 intermediate the valve lands 26 and 28 and is also connected through a restriction 48 and a signal passage 50 with the signal control chamber 34.

The clutch apply passage 46 is connected with the valve bore 14 intermediate the valve lands 24 and 26. The clutch feed passage 44 is connected with the valve bore 14 at a position which can be selectively opened and closed by the valve land 24, and as seen in FIG. 1, the valve land 24 is positioned to close the feed passage 44. The valve bore 14 also has connected thereto a pair of exhaust passages 52, 54 which are selectively controlled to be opened or closed by the respective valve lands 24 and 26.

The valve assembly 10 also includes a timing passage 56 which is connected with the valve bore 14 at the timing chamber 30 and also at a position which is selectively open to the control chamber 32 by the position of valve land 26.

The solenoid valve 18 is a conventional solenoid valve which is operable to open the signal control chamber 34 to an exhaust passage, not shown, and to close the signal control chamber 34 from exhaust in response to actuation of the solenoid valve 18. When the solenoid valve 18 is opened, the pressure in signal control chamber 34 will be essentially equal to exhaust. Due to the restriction 48, which limits the volume of oil that enters the chamber 34, a significant pressure will not be developed in the signal control chamber 34 when the solenoid valve 18 is open.

The differential area of control chamber 32 is continually pressurized by the oil supplied to the actuator feed passage 42 from the control system 38.

As seen in FIG. 1, the clutch 40 is disengaged by the fluid connection between passage 46 and exhaust passage 54 between the valve lands 24 and 26. The clutch feed passage 44 is blocked or closed by the valve land 24. The timing chamber 30 is open to the exhaust passage 52 as is the timing passage 56.

Due to the differential area of the control chamber 32 and the exhausting of signal controlling chamber 34, the valve spool 16 is urged to its rightwardmost position, as seen in FIG. 1, which causes valve land 26 to close the timing passage 56 from the control chamber 32. This eliminates the need for a spring to position the valve spool 16 in the downshifted condition.

When it is desirable to engage the clutch 40, the control system 38 will issue an electrical signal to the solenoid valve 18, thereby closing the signal control chamber 34 to exhaust, and permitting a controlled pressure rise therein as pressurized fluid flows through the restriction 48. When the pressure in the signal control chamber 34 is sufficient to overcome the force on the differential area of control chamber 32, the valve spool 16 will begin moving leftward thereby opening the clutch feed passage 44 to the clutch apply passage 46 while simultaneously closing the exhaust passages 52 and 54.

Figure 2:
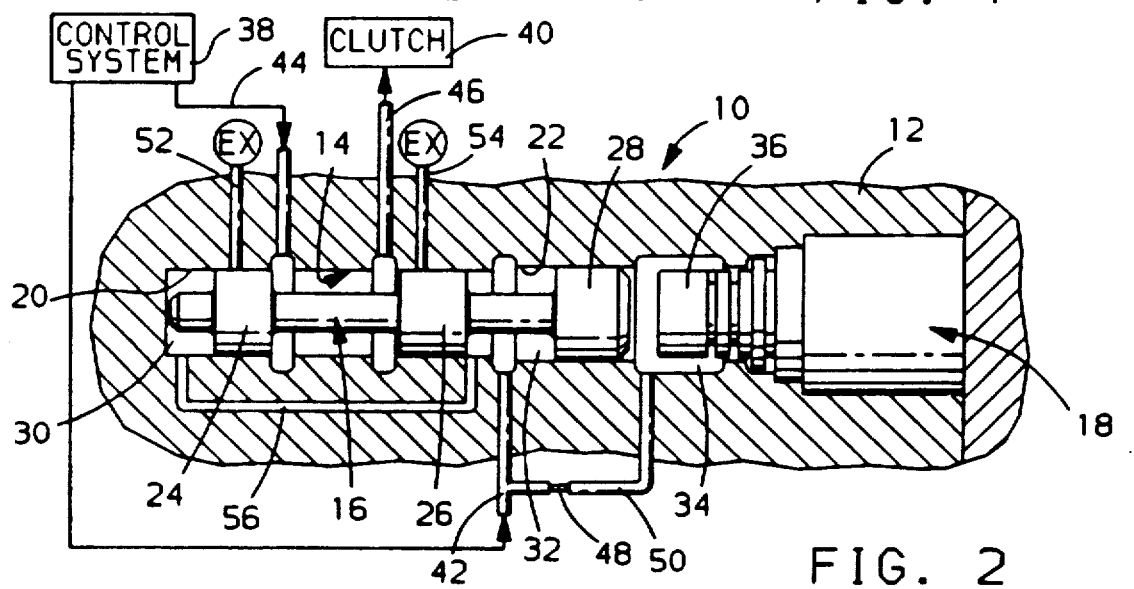
FIG. 2 is a diagrammatic representation similar to FIG. 1, wherein the valve spool of the valve assembly is disposed in another operating mode.

Also, substantially simultaneous with the closing of exhaust passage 52, the feed passage 42 is opened to the timing passage 56 thereby permitting a buildup of pressure in the timing chamber 30. The restriction to fluid flow provided by the timing passage 56 determines the time requirement for the timing chamber 30 to be pressurized. During this time period, the clutch 40 is subjected to unrestricted fluid flow from the clutch feed passage 44, such that the apply chamber of the clutch can be filled with oil. This is the mode of operation shown in FIG. 2.

As the fluid pressure in the timing chamber 30 increases, the valve spool 16 will be moved rightward by the combination of forces in the timing chamber 30 and control chamber 32, as opposed by the force in the signal control chamber 34. The rightward movement of the valve spool 16 will cause a metering of fluid flow from the feed passage 44 to the apply passage 46 thereby controlling the pressure rise within the control apply chamber which results in a controlled clutch apply time.

Figure 3:
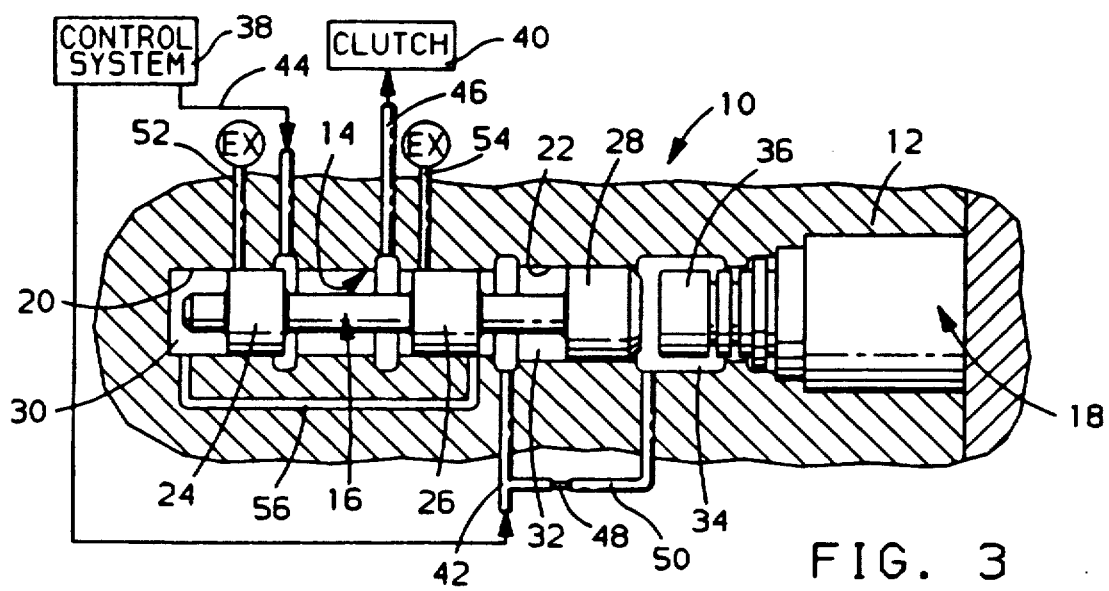
FIG. 3 is a diagrammatic representation of a valve assembly similar to FIG. 1, wherein the valve spool is disposed in yet another mode of operation.

The rightward movement of the valve spool 16 may result in a closing of the timing passage 56, however, the fluid pressure in signal control chamber 34 will continue to rise, such that the valve spool 16 will move slightly leftward thereby reopening the timing passage 56 to the actuator feed passage 42. The valve will assume a substantially stable position, as shown in FIG. 3, wherein the timing passage 56 and clutch feed passage 44 are controlled for metered flow which thereby controls the pressure rise within the clutch 40.

After a predetermined time, the clutch 40 will be fully engaged and the valve spool 16 will reach a point of equilibrium on which the pressure forces thereon are balanced. When the clutch 40 is to be disengaged, the solenoid 18 is controlled to the "off" state thereby exhausting the signal chamber 34, such that the forces on the valve spool 16 in both the timing chamber 30 and control chamber 32 will force the valve rightward to the position shown in FIG. 1. In this position, the timing chamber 30 is exhausted via passage 52 and the control chamber 32 remains pressurized to thereby maintain the clutch 40 in the disengaged position, and the valve spool 16 in the rightward position, shown in FIG. 1.

The valve timing, and therefore the clutch engagement timing, can be affected by the size of the restriction 48, the volume of timing chamber 30 and the flow restriction presented by the timing passage 56. The positioning of the valve lands 24 and 26, relative to the various passages controlled thereby, will also have an affect on valve timing, and therefore on clutch engagement timing. The effect and interaction of these parameters is known to the designer of hydraulic control circuits and can, therefore, be predetermined to accommodate the valve timing desired.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A clutch timing control valve comprising: a valve body having a stepped diameter bore including two end portions, a first diameter bore extending axially from one of the end portions and a second diameter bore extending axially between the first diameter bore and the other of the end portions; a valve spool having a pair of first diameter axially spaced valve lands slidably disposed in the first diameter bore and a second diameter valve land slidably disposed in the second diameter bore, one of said first diameter lands cooperating with said one end and said first diameter bore to form a timing chamber, the other of said first diameter lands cooperating with said first and second diameter bores and said second diameter valve land to form a first control chamber and said second diameter valve land, said second diameter valve bore and said other end cooperating to define a second control chamber; control means operatively connected with said second control chamber and being selectively operable between off and on status for controlling fluid pressure therein; actuator feed passage means for delivering pressurized fluid to said first control chamber; signal passage and restriction means for providing fluid communication between said actuator feed passage means and said second control chamber; timing feed passage means disposed in fluid communication with said timing chamber and with said first diameter bore adjacent said first control chamber; clutch feed passage means, clutch apply passage means and exhaust passage means each communicating with said first diameter bore; said first diameter axially spaced valve lands being selectively position controlled by fluid pressure in said first control chamber, said second control chamber and said timing chamber to close said feed passage means and said timing feed passage means when said control means is in the off state, to permit free fluid flow between said feed passage means and said apply passage means when said control means is selectively operated from said off state to said on state and to restrict fluid flow between said feed passage means and said apply passage means when said control means is maintained in said on state for a predetermined period of time.

2. The clutch timing control valve defined in claim 1, wherein the first control chamber is continually pressurized to urge the valve spool toward a downshift position to exhaust said apply passage means when said control means is in the off state.

* * * * *